(12) United States Patent
Walker et al.

(10) Patent No.: US 12,471,527 B2
(45) Date of Patent: Nov. 18, 2025

(54) SYSTEM AND METHOD FOR MONITORING CROP MATERIAL THICKNESS WITHIN AN AGRICULTURAL HARVESTER

(71) Applicant: CNH Industrial America LLC, New Holland, PA (US)

(72) Inventors: Eric L. Walker, Narvon, PA (US); Cory Douglas Hunt, Millersville, PA (US); Bart Lenaerts, Zutendaal (BE)

(73) Assignee: CNH Industrial America LLC, New Holland, PA (US)

( * ) Notice: Subject to any disclaimer, the term of this patent is extended or adjusted under 35 U.S.C. 154(b) by 977 days.

(21) Appl. No.: 17/546,775

(22) Filed: Dec. 9, 2021

(65) Prior Publication Data

US 2023/0180661 A1 Jun. 15, 2023

(51) Int. Cl.
*A01D 41/127* (2006.01)
*A01B 79/00* (2006.01)
(Continued)

(52) U.S. Cl.
CPC .......... *A01D 41/127* (2013.01); *A01B 79/005* (2013.01); *G01B 5/10* (2013.01);
(Continued)

(58) Field of Classification Search
CPC .... A01B 79/005; A01B 63/24; A01D 41/127; A01D 45/021; A01F 12/88; A01F 12/38;
(Continued)

(56) References Cited

U.S. PATENT DOCUMENTS 6,984,976 B1 1/2006 Tam
10,356,979 B2 7/2019 Mahieu et al.
(Continued)

FOREIGN PATENT DOCUMENTS

DE 19648126 A1 5/1998
DE 102005050751 A1 8/2007
(Continued)

OTHER PUBLICATIONS

Extended European Search Report and Written Opinion for EP Application No. 22212554.4 dated Apr. 14, 2023 (nine pages).

*Primary Examiner* — Joseph M Rocca
*Assistant Examiner* — Robert E Pezzuto
(74) *Attorney, Agent, or Firm* — Dority & Manning, P.A.

(57) ABSTRACT

An agricultural harvester includes a frame and a crop cleaning assembly supported on the frame. The crop cleaning assembly, in turn, includes an oscillating component configured to oscillate relative to the frame in a manner that conveys crop material across the oscillating component. Furthermore, the agricultural harvester includes a RADAR sensor configured to emit an output signal directed at the crop material present on the oscillating component and detect an echo signal reflected by the crop material present on the oscillating component. Additionally, the agricultural harvester includes a computing system communicatively coupled to the RADAR sensor. In this respect, the computing system is configured to determine a thickness of the crop material present on the oscillating component based on detected echo signal.

20 Claims, 8 Drawing Sheets

(51) Int. Cl.
  *G01B 5/10*  (2006.01)
  *G01B 21/12*  (2006.01)
  *G01N 33/00*  (2006.01)
  *G01S 13/86*  (2006.01)
  *A01B 63/24*  (2006.01)
  *A01D 45/02*  (2006.01)

(52) U.S. Cl.
  CPC ......... *G01B 21/12* (2013.01); *G01N 33/0098*
   (2013.01); *G01S 13/86* (2013.01); *A01B 63/24*
    (2013.01); *A01D 45/021* (2013.01)

(58) Field of Classification Search
  CPC ...... G01B 5/10; G01B 21/12; G01N 33/0098;
                G01S 13/86
  See application file for complete search history.

(56) References Cited

U.S. PATENT DOCUMENTS

| | | | |
|---|---|---|---|
| 2017/0196169 A1* | 7/2017 | Duquesne | ............ A01F 12/448 |
| 2020/0245556 A1 | 8/2020 | Advani et al. | |
| 2022/0071088 A1* | 3/2022 | Hermann | .............. A01F 12/448 |

FOREIGN PATENT DOCUMENTS

| | | |
|---|---|---|
| EP | 3689124 A1 | 8/2020 |
| EP | 3714674 A1 | 9/2020 |
| JP | 6578112 B2 | 9/2019 |

\* cited by examiner

SYSTEM AND METHOD FOR MONITORING CROP MATERIAL THICKNESS WITHIN AN AGRICULTURAL HARVESTER

FIELD OF THE INVENTION

The present disclosure generally relates to agricultural harvesters and, more particularly, to systems and methods for monitoring crop material thickness within an agricultural harvester.

BACKGROUND OF THE INVENTION

An agricultural harvester is a machine used to harvest and process crops growing within a field. For example, a combine harvester is a type of harvester used to harvest grain crops, such as wheat, oats, rye, barely, corn, soybeans, and/or the like. In general, most harvesters are equipped with a detachable harvesting implement, such as a header. In this respect, as the harvester travels across the field, the harvesting implement cuts and collects the crop from the field. The harvester also includes a crop processing system, which receives the harvested crop material from the harvesting implement and performs various processing operations (e.g., threshing, separating, etc.) on the received crop material.

The crop processing system typically includes a crop cleaning assembly for cleaning or otherwise separating the threshed crop material. More specifically, the crop cleaning assembly generally includes a plurality of sieves configured to oscillate relative to the frame of the harvester. The oscillation of the sieves, in turn, conveys the crop material across these components in a manner that cleans or otherwise separates the harvested crop material (e.g., separates the grain, seeds, etc. from the chaff and/or other impurities). The thickness of the crop material on the pans/sieves is an important parameter for the operation of the harvester. In this respect, systems have been developed to monitor this thickness. While such systems work well, further improvements are needed.

Accordingly, an improved system and method for monitoring crop material thickness within an agricultural harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural harvester. The agricultural harvester includes a frame and a crop cleaning assembly supported on the frame. The crop cleaning assembly, in turn, includes an oscillating component configured to oscillate relative to the frame in a manner that conveys crop material across the oscillating component. Furthermore, the agricultural harvester includes a RADAR sensor configured to emit an output signal directed at the crop material present on the oscillating component and detect an echo signal reflected by the crop material present on the oscillating component. Additionally, the agricultural harvester includes a computing system communicatively coupled to the RADAR sensor. In this respect, the computing system is configured to determine a thickness of the crop material present on the oscillating component based on detected echo signal.

In another aspect, the present subject matter is directed to a system for monitoring crop material thickness within an agricultural harvester. The system includes a crop cleaning assembly having an oscillating component configured to oscillate relative to a frame of the agricultural harvester in a manner that conveys crop material across the oscillating component. Moreover, the system includes a RADAR sensor configured to emit an output signal directed at the crop material present on the oscillating component and detect an echo signal reflected by the crop material present on the oscillating component. In addition, the system includes a computing system communicatively coupled to the RADAR sensor. As such, the computing system is configured to determine a thickness of the crop material present on the oscillating component based on detected echo signal.

In a further aspect, the present subject matter is directed to a method for monitoring crop material thickness within an agricultural harvester. The agricultural harvester, in turn, includes a crop cleaning assembly having an oscillating component configured to oscillate relative to a frame of the agricultural harvester in a manner that conveys crop material across the oscillating component. The method includes receiving, with a computing system, data from a RADAR sensor configured to emit an output signal directed at the crop material present on the oscillating component and detect an echo signal reflected by the crop material present on the oscillating component. Furthermore, the method includes determining, with the computing system, a thickness of the crop material present on the oscillating component based on the received data. Additionally, the method includes comparing, with the computing system, the determined thickness of the crop material to a predetermined thickness range. Moreover, the method includes adjusting, with the computing system, an operation of the crop cleaning assembly when the determined thickness falls outside of the predetermined thickness range.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
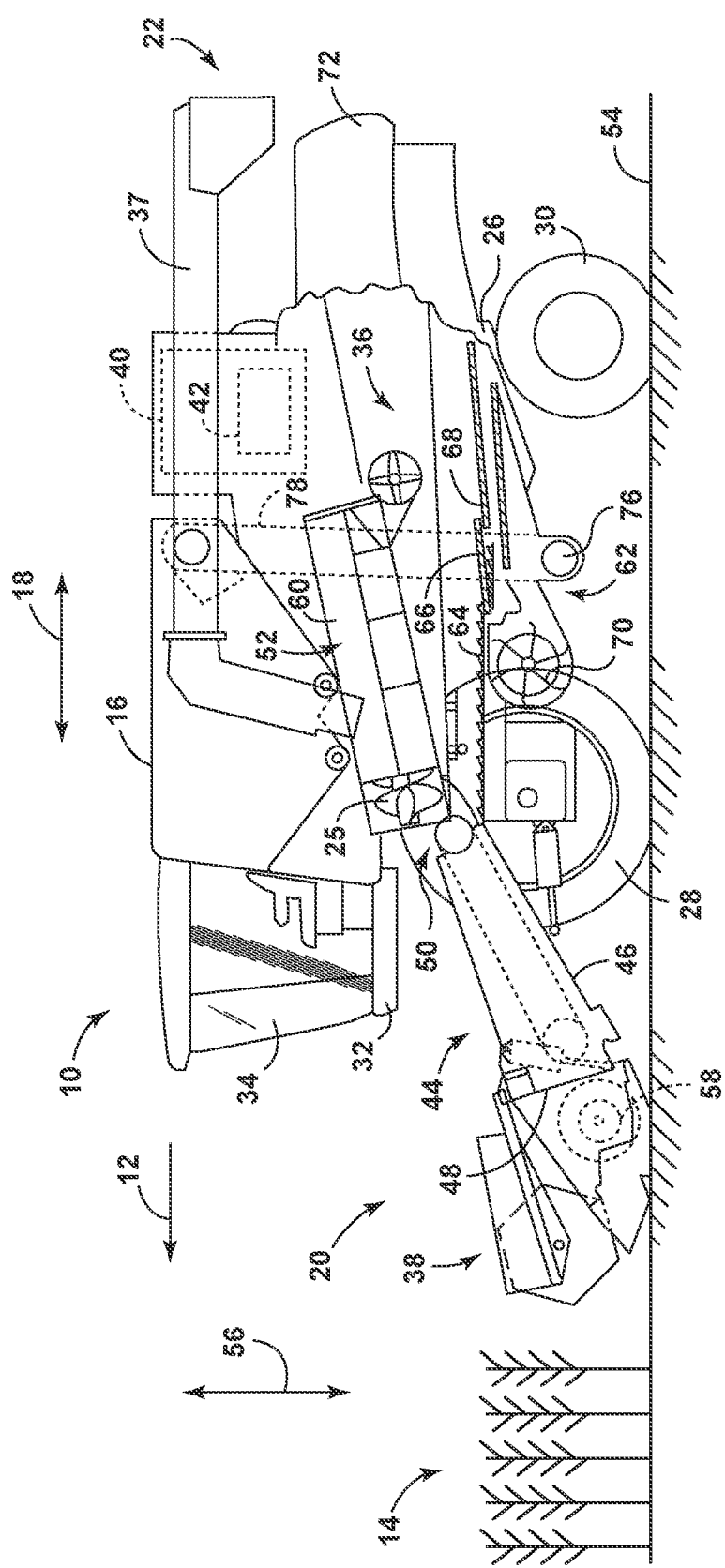
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for monitoring crop material thickness within an agricultural harvester. As will be described below, the harvester includes a crop cleaning assembly configured to clean or otherwise separate the harvested crop material. In this respect, the crop cleaning assembly includes one or more oscillating components (e.g., a pan(s), a sieve(s), etc.) configured to oscillate relative to the frame of the harvester during a harvesting operation. In this respect, the oscillation conveys the crop material across the oscillating component(s) in a manner that separates the grain, seed, and/or the like within the harvested crop material from the chaff or impurities.

In several embodiments, a computing system of the disclosed system is configured to determine the thickness of the crop material present on the oscillating component(s). More specifically, during the performance of a harvesting operation, the computing system is configured to receive data from one or more RADAR sensors positioned within or adjacent to the crop cleaning assembly. Each RADAR sensor is, in turn, configured to emit an output signal (e.g., a radio wave or microwave signal) directed at the crop material present on one of the oscillating components. Moreover, each RADAR sensor is configured to detect an echo signal reflected by the crop material present on the corresponding oscillating component. One or more parameters of the echo signal (e.g., its intensity) may generally be indicative of thickness of the crop material on the corresponding oscillating component. As such, the computing system may determine the thickness(es) of the crop material on the oscillating component(s) based on the data received from the RADAR sensor(s). In some embodiments, the RADAR sensor(s) may be positioned below the oscillating component(s) to prevent airborne chaff within the crop cleaning assembly from interfering the output signal(s).

The disclosed system and method improve the operation of the agricultural harvester. As described above, the disclosed system and method determines the thickness(es) of the crop material present on the oscillating component(s) of the crop cleaning assembly based on RADAR sensor data. More specifically, RADAR sensor output signals can penetrate through certain materials, such as the crop material, to a much greater extent than acoustic sensor signals (e.g., ultrasonic sensor signals). In this respect, and unlike acoustic sensor data, RADAR sensor data permits for the detection of multiple interfaces associated with the crop material present on the oscillating component(s). For example, RADAR sensor data allows for the detection of the interface between the crop material and the oscillating component(s) and the interface between the crop material and the air above the crop material. The detection of both interfaces allows for a more accurate determination of the crop material present on the oscillating component(s) than the detection of a single interface.

Referring now to the drawings, FIG. 1 illustrates a partial sectional side view of the agricultural harvester 10. In general, the harvester 10 is configured to travel across a field in a forward direction of travel (indicated by arrow 12) to harvest a standing crop 14 present within the field. While traversing the field, the harvester 10 is configured to process the harvested crop material and store the grain, seed, or the like within a crop tank 16 of the harvester 10.

As shown, the harvester 10 extends in a longitudinal direction 18 from a forward end 20 of the harvester 10 to an aft end 22 of the harvester 10. In this respect, the longitudinal direction 18 extends parallel to the direction of travel 12. Furthermore, the harvester 10 extends in a lateral direction 24, with the lateral direction 24 (FIG. 3) extending perpendicular to the longitudinal direction 18 and the direction of travel 12.

In the illustrated embodiment, the harvester 10 is configured as an axial-flow type combine in which the harvested crop material is threshed and separated while being advanced by and along a rotor 25 extending in the longitudinal direction 20. However, in alternative embodiments, the harvester 10 may have any other suitable harvester configuration, such as a traverse-flow type configuration in which the rotor extends in the lateral direction 24.

The harvester 10 may include a chassis or main frame 26 configured to support and/or couple to various components of the harvester 10. For example, in several embodiments, the harvester 10 may include a pair of driven, front wheels 28 and a pair of steerable, rear wheels 30 coupled to the chassis 26. As such, the wheels 28, 30 may be configured to support the harvester 10 relative to the ground and move the harvester 10 in the forward direction of travel 12. Furthermore, the harvester 10 may include an operator's platform 32 having an operator's cab 34, a crop processing system 36, the crop tank 16, and a crop unloading tube 37 supported by the chassis 26. As will be described below, the crop processing system 36 may be configured to perform various processing operations on the harvested crop material as the crop processing system 36 transfers the harvested crop from a harvesting implement 38 (e.g., a header) of the harvester 10 and through the harvester 10. Moreover, the harvester 10 may include an engine 40 and a transmission 42 mounted on the chassis 26. The transmission 42 may be operably coupled to the engine 40 and may provide variably adjusted gear ratios for transferring engine power to the wheels 28 via a drive axle assembly (or via axles if multiple drive axles are employed).

Additionally, as shown in FIG. 1, the harvester 10 includes a feeder 44 that couples to and supports the harvesting implement 38. More specifically, the feeder 44 may include a feeder housing 46 extending from a forward end 48 to an aft end 50. As will be described below, the forward end 48 of the feeder housing 46 may, in turn, be coupled to harvesting implement 38. Moreover, the aft end 50 of the feeder housing 46 may be pivotably coupled to the chassis 26 adjacent to a threshing and separating assembly 52 of the crop processing system 36. Such a pivotable coupling may permit movement of the harvesting implement 38 relative to a field surface 54 in a vertical direction (indicated by arrow 56).

As the harvester 10 is propelled in the forward direction of travel 12 over the field with the standing crop 14, the crop material is severed from the stubble by a cutter bar (not shown) positioned at the front of the harvesting implement 38. The crop material is delivered by a header conveyance device 58 (e.g., an auger, belt, chain, etc.) to the forward end 48 of the feeder housing 46, which supplies the harvested crop material to the threshing and separating assembly 52. In general, the threshing and separating assembly 52 may include a cylindrical chamber 60 in which the rotor 25 is rotated to thresh and separate the harvested crop material received therein. That is, the harvested crop material is rubbed and beaten between the rotor 25 and the inner surfaces of the chamber 60 to loosen and separate the grain, seed, or the like from the straw.

The crop material separated by the threshing and separating assembly 52 may fall onto a crop cleaning assembly 62 of the crop processing system 36. As will be described below, the crop cleaning assembly 62 may include a series of oscillating components, such as one or more pans 64, pre-sieves 66, and/or sieves 68, that are configured to oscillate relative to the frame 26. As such, the separated crop material may be spread out via the oscillation of such components 64, 66, 68 and the grain, seeds, or the like may eventually fall through apertures defined by the sieve(s) 68. Additionally, a cleaning fan 70 may be positioned adjacent to one or more of the pre-sieve(s) 66 and the sieve(s) 68 to provide an air flow through that removes chaff and other impurities from the crop material present thereon. The impurities may be discharged from the harvester 10 through the outlet of a straw hood 72 positioned at the aft end 22 of the harvester 10. The cleaned harvested crop passing through the sieve(s) 68 may then fall into a trough of an auger 76, which may transfer the harvested crop to an elevator 78 for delivery to the crop tank 16.

Figure 2:
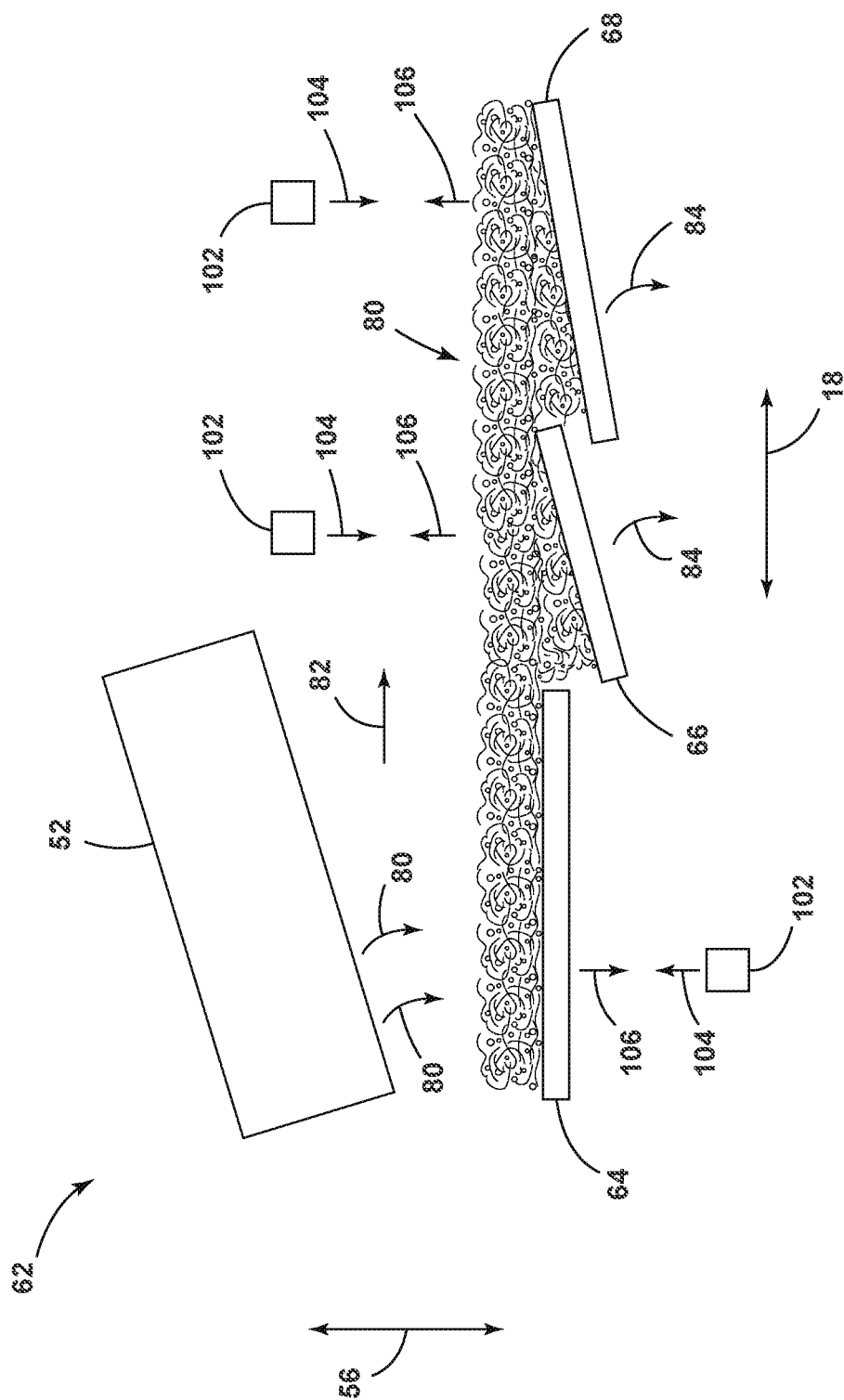
FIG. 2 illustrates a simplified side view of one embodiment of a crop cleaning assembly of an agricultural harvester in accordance with aspects of the present subject matter, particularly illustrating a plurality of RADAR sensors positioned relative to oscillating components of the crop cleaning assembly.

FIG. 2 illustrates a simplified side view of the crop cleaning assembly 62. As mentioned above, the crop cleaning assembly 62 includes one or more oscillating components configured to oscillate relative to the frame 26 of the harvester 10 during a harvesting operation. For example, in the illustrated embodiment, the crop cleaning assembly 62 includes a pan 64, a pre-sieve 66, and a sieve 68. As shown, the pan 64 is positioned below the threshing assembly 52 in the vertical direction 56. Furthermore, the pre-sieve 66 may be positioned aft of the pan 64 along the longitudinal direction 18. Additionally, the sieve 68 may be positioned aft of the pre-sieve 66 along the longitudinal direction 18. However, in alternative embodiments, the crop cleaning assembly 62 may include any other suitable type and/or number of oscillating components.

During operation, the oscillation of the oscillating component(s) conveys crop material across the oscillating component(s) in a manner that separates the grain, seed, and/or the like within the crop material from the chaff or impurities. More specifically, threshed crop material 80 may fall through the threshing assembly 52 and land on the pan 64 underneath. In this respect, the pan 64, the pre-sieve 66, and the sieve 68 oscillate relative to the frame 26 (e.g., in the longitudinal direction 18), thereby conveying the crop material 80 across these components 64, 66, 68 (e.g., as indicated by arrow 82). As the crop material 80 moves across the pan/pre-sieve/sieve 64/66/68, the grain, the seed, or the like (e.g., as indicated by arrow 84) within the crop material 80 is cleaned and separated from the chaff or other impurities. The cleaned and separated grain/seed 84 falls through the apertures (not shown) defined by the pre-sieve 66 and the sieve 68 for eventual delivery to the auger 76 (FIG. 1). Conversely, the chaff/impurities are discharged from the harvester 10 via the straw hood 72.

The configuration of the agricultural harvester 10 described above and shown in FIGS. 1 and 2 is provided only to place the present subject matter in an exemplary field of use. Thus, the present subject matter may be readily adaptable to any manner of agricultural harvester configuration.

In several embodiments, one or more RADAR sensors 102 may be positioned within and/or adjacent to the crop cleaning assembly 62. In general, each RADAR sensor 102 is configured to emit one or more output signals (indicated by arrows 104) directed at the crop material present on one of the oscillating components. Furthermore, each RADAR sensor 102 is configured to detect an echo signal (indicated by arrows 106) reflected by the crop material present on the corresponding oscillating component. As will be described below, the detected echo signal 106 may generally be used to determine the thickness of the crop material present on the corresponding oscillating component of the crop cleaning assembly 62.

The RADAR sensor(s) 102 may be configured to direct output signals 104 at any suitable oscillating component(s) within the crop cleaning assembly 62. For example, in the illustrated embodiment, a RADAR sensor 102 is configured to emit output signals 104 directed at the crop material 80 present on the pan 64 and detect an echo signal 106 reflected by the crop material present on the pan 64. Additionally, in the illustrated embodiment, another RADAR sensor 102 is configured to emit output signals 104 directed at the crop material 80 present on the pre-sieve 66 and detect an echo signal 106 reflected by the crop material present on the pre-sieve 66. Moreover, in the illustrated embodiment, a further RADAR sensor 102 is configured to emit output signals 104 directed at the crop material 80 present on the sieve 68 and detect an echo signal 106 reflected by the crop material present on the sieve 68. However, in other embodiments, the RADAR sensor(s) 102 may be configured to direct output signals 104 at only one or two of the pan 64, the pre-sieve 66, or the sieve 68. Additionally, or alternatively, the RADAR sensor(s) 102 may be configured to direct output signals 104 at other oscillating components within the crop cleaning assembly 62.

In several embodiments, the RADAR sensor(s) 102 may be positioned below the oscillating component(s) in the vertical direction 56. For example, as shown in FIG. 2, one of the RADAR sensors 102 is positioned below the pan 64 in the vertical direction 56. Such positioning of the RADAR sensor(s) 102 generally prevents airborne crop material present within the space above the oscillating component(s) from interfering with the output signals 104 being directed at the crop material present on the oscillating component(s). Moreover, positioning of the RADAR sensor(s) 102 below the oscillating component(s) generally protects the RADAR sensor(s) 102 from exposure to the airborne crop material. In such embodiments, the oscillating component(s) may be formed from a material that can easily be penetrated by the output signals (e.g., plastic).

Furthermore, in other embodiments, the RADAR sensor(s) 102 may be positioned above the oscillating component(s) in the vertical direction 56. For example, as shown in FIG. 2, one of the RADAR sensors 102 is positioned above the pre-sieve 66 in the vertical direction 56. In addition, another RADAR sensor 102 is positioned above the sieve 68 in the vertical direction 56. Such positioning of the RADAR sensor(s) 102 may allow for formation of the oscillating components from a metallic material or other material that is highly reflective of the output signals from the RADAR sensor(s) 102. Moreover, in some embodiments, the RADAR sensors 102 may be positioned above some of the oscillating components and below other oscillating components.

Figure 3:
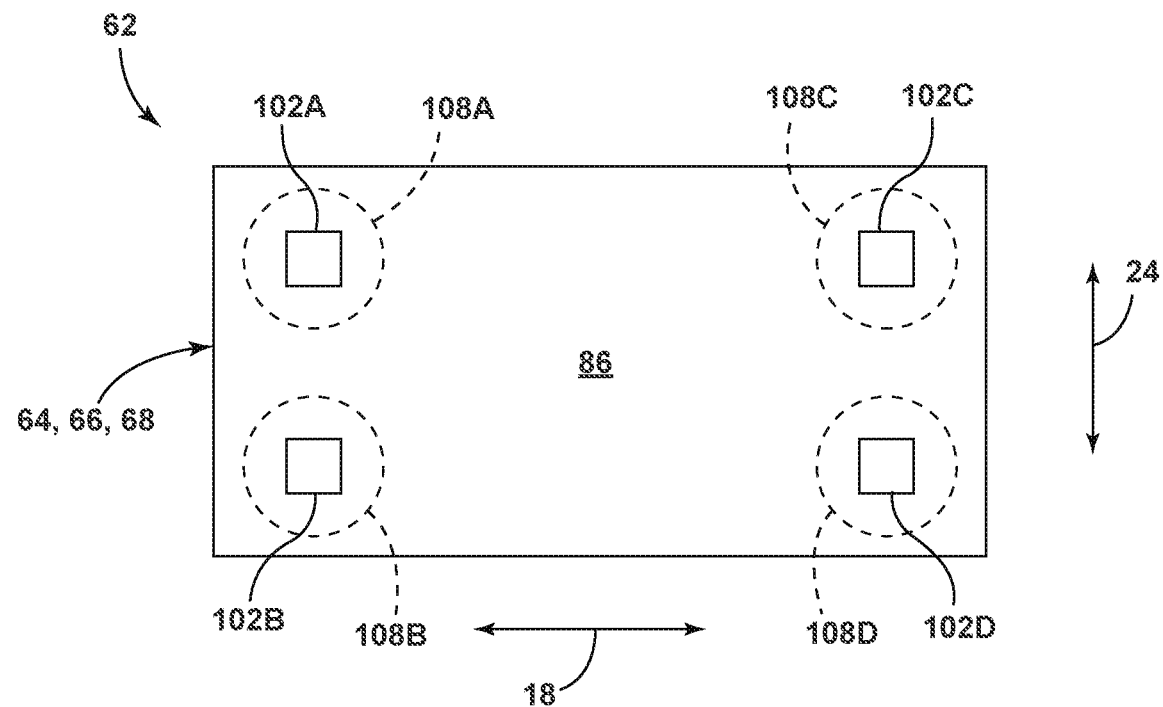
FIG. 3 illustrates a partial top view of one embodiment of a crop cleaning assembly of an agricultural harvester in accordance with aspects of the present subject matter, particularly illustrating various locations on an oscillating component of the crop cleaning assembly at which the thickness of crop material can be measured.

Additionally, in several embodiments, multiple RADAR sensor 102 may be configured to direct output signals 104 at differing locations on a single oscillating component. For example, as shown in FIG. 3, in the illustrated embodiment, first, second, third, and fourth RADAR sensors 102A-D are positioned above a top surface 86 of a pan/pre-sieve/sieve 64/66/68. In this respect, a first RADAR sensor 102A is configured to emit output signals directed at the crop material present at a first location 108A on the top surface 86 and detect an echo signal reflected by the crop material present at the first location 108A. Furthermore, a second RADAR sensor 102B is configured to emit output signals directed at the crop material present at a second location 108B on the top surface 86 and detect an echo signal reflected by the crop material present at the second location 108B. Furthermore, a second RADAR sensor 102B is configured to emit output signals directed at the crop material present at a second location 108B on the top surface 86 and detect an echo signal reflected by the crop material present at the second location 108B. In addition, a third RADAR sensor 102C is configured to emit output signals directed at the crop material present at a third location 108C on the top surface 86 and detect an echo signal reflected by the crop material present at the third location 108C. Moreover, a fourth RADAR sensor 102D is configured to emit output signals directed at the crop material present at a fourth location 108D on the top surface 86 and detect an echo signal reflected by the crop material present at the fourth location 108D. However, in alternative embodiments, any suitable number of RADAR sensors 102 may be configured to direct output signals at an oscillating component within the crop cleaning assembly 62, such as one, two, three, five, or more RADAR sensors 102.

The locations on the oscillating component to which the output signals of the RADAR sensors 102 are directed may be spaced apart from each other in any suitable manner. For example, as shown in FIG. 3, the first and second locations 108A, 108B are spaced apart from the third and fourth locations 108C, 108D in the longitudinal direction 18. Furthermore, the first and third locations 108A, 108C are spaced apart from the second and fourth locations 108B, 108D in the lateral direction 18. As will be described below, the use of RADAR sensors 102 directing output signals at differing locations on a single oscillating component allows for determination the thickness distribution of the crop material across the oscillating component (e.g., the thickness distribution in the longitudinal and/or lateral directions 18, 24).

Figure 4:
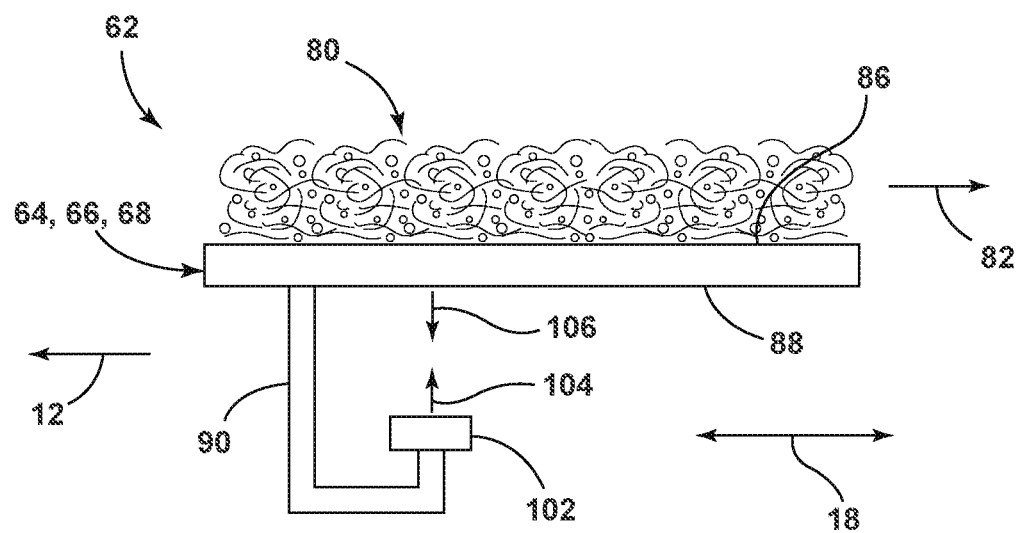
FIG. 4 illustrates a side view of one embodiment of a crop cleaning assembly of an agricultural harvester in accordance with aspects of the present subject matter, particularly illustrating a RADAR sensor coupled to an oscillating component of the crop cleaning assembly.

Additionally in some embodiments, the RADAR sensor(s) 102 may be coupled to the oscillating component(s). In such embodiments, RADAR sensor(s) 102 may oscillate relative to the frame 26 of the harvester 10 with the oscillating component(s). For example, as shown in FIG. 4, in the illustrated embodiment, the RADAR sensor 102 is coupled to a bottom surface 88 of the pan/pre-sieve/sieve 64/66/68 via an arm 90. Coupling the RADAR sensor(s) 102 to the oscillating component(s) such that the RADAR sensor(s) 102 oscillate with the oscillating component(s) reduce the processing necessary to determine the crop material thickness(es). Specifically, in such configurations, it is not necessary to process out the relative movement between the RADAR sensor(s) 102 and the oscillating component(s) because such components move together. However, in alternative embodiments, the RADAR sensor(s) 102 may be coupled to the frame 26 such that the oscillating component(s) oscillates relative to the RADAR sensor(s) 102.

The RADAR sensor(s) 102 may correspond to any suitable sensor(s) or sensing device(s) configured to capture data indicative of crop material thickness using radio waves and/or microwaves. For example, the RADAR sensor(s) 102 may be configured to emit one or more radio wave or microwave output signals directed toward a portion of the crop material within its field of view or sensor detection zone. A portion of the output signal(s) may, in turn, be reflected by the crop material and/or the oscillating component(s) as an echo signal(s). Moreover, the RADAR sensor(s) 102 may be configured to receive the reflected echo signal(s).

Figure 5:
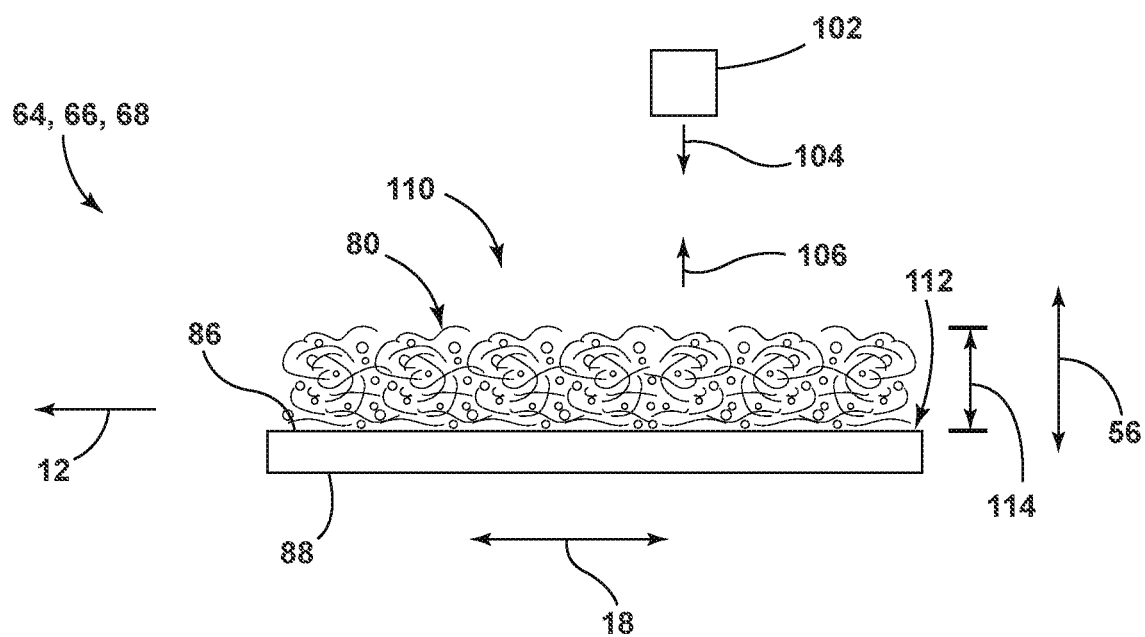
FIG. 5 illustrates a side view of one embodiment of an oscillating component within a crop cleaning assembly of an agricultural harvester in accordance with aspects of the present subject matter.
Figure 6:
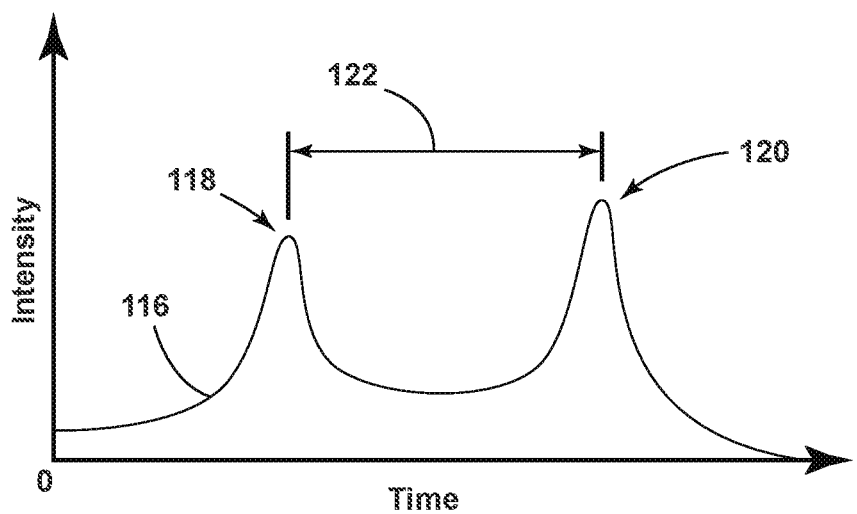
FIG. 6 illustrates a graphical view of an example data set charting intensity of an echo signal detected by a RADAR sensor over time in accordance with aspects of the present subject matter.

FIGS. 5 and 6 illustrate the operation of a RADAR sensor 102 configured as described above. More specifically, FIG. 5 illustrates a RADAR sensor 102 configured to direct an output signal 104 at crop material 80 is present on the top surface 86 of the pan/pre-sieve/sieve 64/66/68. As shown, there is a first interface 110 between the air and the top surface of the crop material 80. Moreover, there is a second interface 112 between the bottom surface of the crop material 80 and the top surface of the 86 of the pan/pre-sieve/sieve 64/66/68. In this respect, a distance (indicated by arrow 114) between the first and second interfaces 110, 112 in the vertical direction 56 generally corresponds to the thickness of the crop material 80.

In general, the intensity of the echo signal 106 increases when being reflected by an interface between different materials. As such, the intensity of the echo signal 106 spikes initially when reflected by the first interface 110 and then spikes again when reflected by the second interface 112. The time between when these intensity spikes occur can then be used to determine distance between such interfaces 110, 112, which corresponds to the thickness 114 of the crop material 80. For example, FIG. 6 illustrates a graphical view of an example data set charting intensity of the echo signal 106 detected by a RADAR sensor 102 over time (e.g., as indicated by line 116). As shown, there is a first intensity spike 118 corresponding to when the echo signal 106 is reflected by the first interface 110. Moreover, there is a second intensity spike 120 corresponding to when the echo signal 106 is reflected by the second interface 112. The time occurring between these intensity spikes (e.g., as indicated by arrow 122) can then be used to determine the thickness 114 of the crop material 80.

Figure 7:
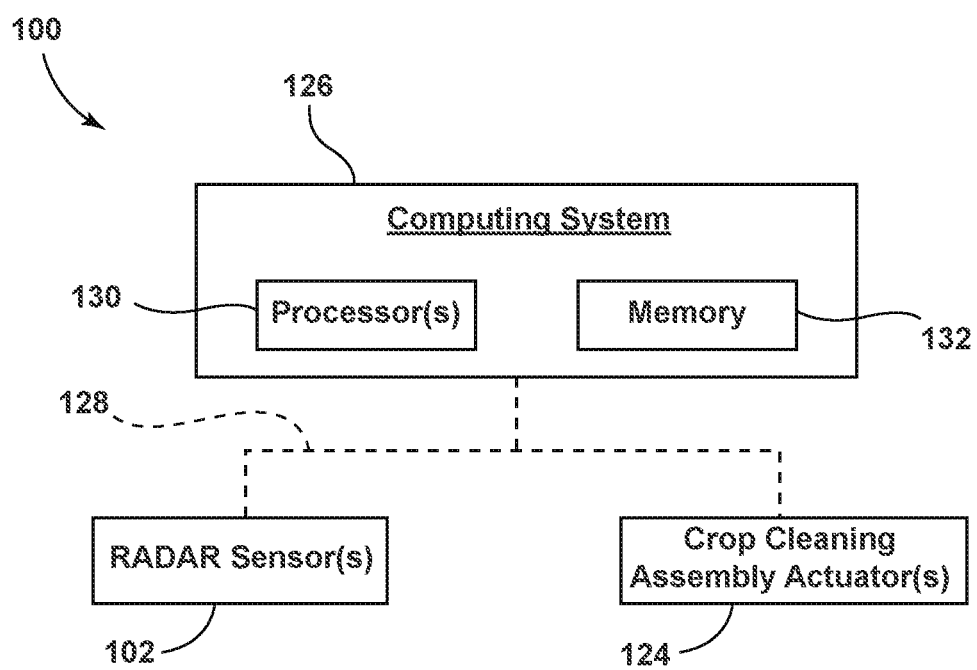
FIG. 7 illustrates a schematic view of one embodiment of a system for monitoring crop material thickness within an agricultural harvester in accordance with aspects of the present subject matter.

Referring now to FIG. 7, a schematic view of one embodiment of a system 100 for monitoring crop material thickness within an agricultural harvester is illustrated in accordance with aspects of the present subject matter. In general, the system 100 will be described herein with reference to the agricultural harvester 10 described above with reference to FIGS. 1-6. However, it should be appreciated by those of ordinary skill in the art that the disclosed system 100 may generally be utilized with agricultural harvesters having any other suitable harvester configuration.

As shown in FIG. 7, the system 100 includes one or more crop cleaning assembly actuators 124. In general, the crop cleaning assembly actuator(s) 124 is configured to adjust one or more operating parameters of the crop cleaning assembly 62. In some embodiments, the operating parameter(s) may include the orientation of the oscillating component(s) (e.g., the pan 64, the pre-sieve 66, or the sieve 68) relative to the frame 26 (e.g., in the longitudinal direction 20 and/or the lateral direction 24). Additionally, or alternatively, the operating parameter(s) may include the direction and/or speed of the oscillatory motion of the oscillating component(s). However, in other embodiments, crop cleaning assembly actuator(s) 124 may be configured to adjust any other suitable parameter(s) of the crop cleaning assembly 62.

The crop cleaning assembly actuator(s) 124 may correspond to any suitable actuator(s) configured to adjust or control an operating parameter(s) of the crop cleaning assembly 124. For example, the crop cleaning assembly actuator(s) 124 may be a hydraulic motor(s), a hydraulic cylinder(s), an electric motor(s), and/or the like.

Furthermore, the system 100 includes a computing system 126 communicatively coupled to one or more components of the harvester 10 and/or the system 100 to allow the operation of such components to be electronically or automatically controlled by the computing system 126. For instance, the computing system 126 may be communicatively coupled to the RADAR sensor(s) 102 via a communicative link 128. As such, the computing system 126 may be configured to receive data from the RADAR sensors 102 that is indicative of the thickness of the crop material present on the oscillating component(s) within the crop cleaning assembly 62. Moreover, the computing system 126 may be communicatively coupled to the crop cleaning assembly actuator(s) 124 via the communicative link 128. In this respect, the computing system 126 may be configured to control the operation of the crop cleaning assembly actuator(s) 124 to the control the operation of the crop cleaning assembly 62. In addition, the computing system 126 may be communicatively coupled to any other suitable components of the harvester 10 and/or the system 100.

In general, the computing system 126 may comprise one or more processor-based devices, such as a given controller or computing device or any suitable combination of controllers or computing devices. Thus, in several embodiments, the computing system 126 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 132 of the computing system 126 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 132 may generally be configured to store suitable computer-readable instructions that, when implemented by the processor(s) 130, configure the computing system 126 to perform various computer-implemented functions, such as one or more aspects of the methods and algorithms that will be described herein. In addition, the computing system 126 may also include various other suitable components, such as a communications circuit or module, one or more input/output channels, a data/control bus and/or the like.

The various functions of the computing system 126 may be performed by a single processor-based device or may be distributed across any number of processor-based devices, in which instance such devices may be considered to form part of the computing system 126. For instance, the functions of the computing system 126 may be distributed across multiple application-specific controllers or computing devices, such as a navigation controller, an engine controller, a transmission controller, and/or the like.

Figure 8:
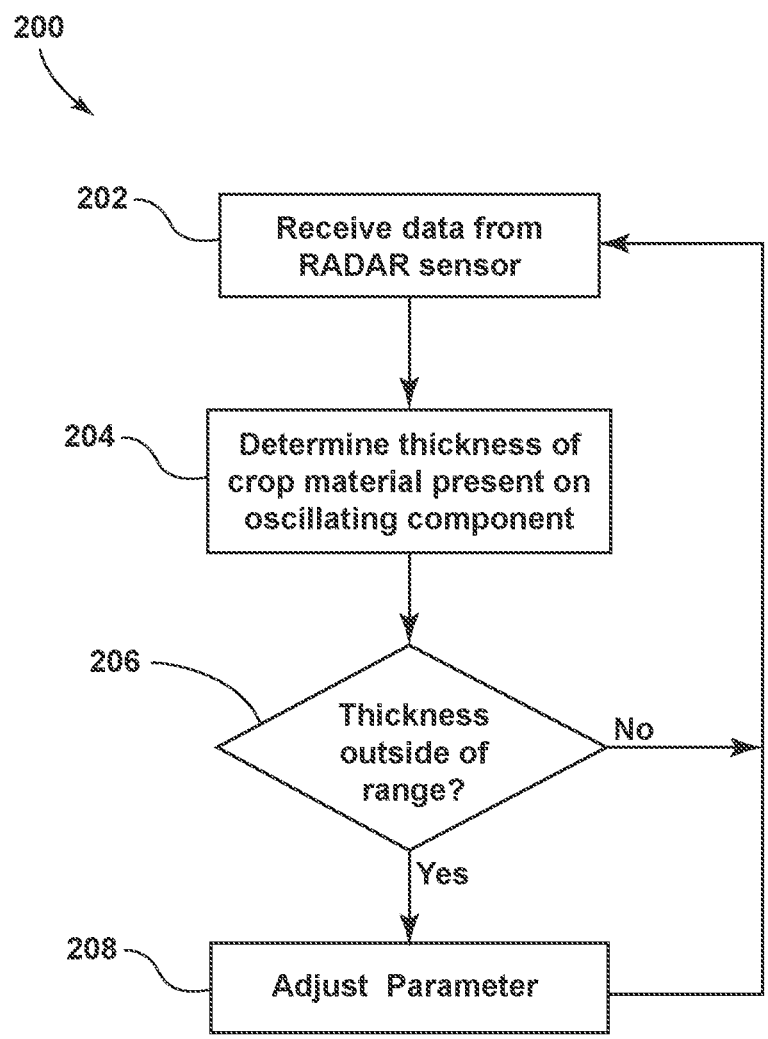
FIG. 8 illustrates a flow diagram providing one embodiment of example control logic for monitoring crop material thickness within an agricultural harvester in accordance with aspects of the present subject matter.

Referring now to FIG. 8, a flow diagram of one embodiment of example control logic 200 that may be executed by the computing system 126 (or any other suitable computing system) for monitoring crop material thickness within an agricultural harvester is illustrated in accordance with aspects of the present subject matter. Specifically, the control logic 200 shown in FIG. 8 is representative of steps of one embodiment of an algorithm that can be executed to monitor crop material thickness within an agricultural harvester in a manner that provides a more accurate determination of crop material thickness than systems relying on acoustic-based sensor data. Thus, in several embodiments, the control logic 200 may be advantageously utilized in association with a system installed on or forming part of an agricultural harvester to allow for real-time monitoring crop material thickness within an agricultural harvester without requiring substantial computing resources and/or processing time. However, in other embodiments, the control logic 200 may be used in association with any other suitable system, application, and/or the like for monitoring crop material thickness within an agricultural harvester.

As shown in FIG. 8, at (202), the control logic 200 includes receiving data from a RADAR sensor configured to emit an output signal directed at crop material present on an oscillating component of a crop cleaning assembly of an agricultural harvester and detect an echo signal reflected by the crop material present on the oscillating component. Specifically, as mentioned above, in several embodiments, the computing system 126 may be communicatively coupled to the RADAR sensor(s) 102 via the communicative link 128. Each RADAR sensor 102 is, in turn, configured to emit one or more output signals 104 directed at the crop material 80 present on an oscillating component (e.g., the pan 64, the pre-sieve 66, and/or the sieve 68) within the crop cleaning assembly 62 of the harvester 10. Moreover, each RADAR sensor 102 is configured to detect an echo signal(s) 106 reflected by the crop material 80 present on the corresponding oscillating component. In this respect, as the harvester 10 travels across the field to perform a harvesting operation thereon, the computing system 126 may receive data from the RADAR sensor(s) 102. Such data may, in turn, be indicative of one or more parameters (e.g., the intensity) of the detected echo signal(s) 106.

The data indicative of the echo signals received at (202) may be sampled based on the oscillatory motion of the oscillating component(s). As described above, the pan/pre-sieve/sieve 64/66/68 may oscillate back and forth at a particular rate. As such, in several embodiments, the computing system 126 may receive the data at (202) at a sampling rate set based on the oscillatory motion of the oscillating component(s). Specifically, the sampling rate may be set such that each successive data sample is associated with the reflection of the echo signal(s) 106 off of the same position on the oscillating component(s) (or crop material present thereon). By controlling the sampling rate of the data received at (202) such that each successive data sample is associated with the same position or location on the corresponding crop material/oscillating component, the effect of the oscillatory movement on the data captured by the RADAR sensor(s) 102 is minimized or eliminated. This, in turn, simplifies the processing of such data when determining the thickness(es) of the crop material present on the oscillating component(s). However, in alternative embodiments, the data may be received at (202) at a sampling rate that is independent of the oscillatory motion of the oscillating component(s).

The sampling may be performed in any suitable manner. For example, in some embodiments, the sampling may be performed by controlling the emission of the output signal(s) 104 by the RADAR sensor(s) 102. Specifically, in such embodiments, the RADAR sensor(s) 102 may emit output signals 104 at a time interval such that each successive output signal 104 contacts the same position on the corresponding oscillating component (or the crop material present thereon). In other embodiments, the sampling may be performed by controlling the detection of the echo signals 106 by the RADAR sensor(s) 102. For example, in such embodiments, the RADAR sensor(s) 102 may be configured to capture data samples of the reflected echo signals 106 at a time interval such that each successive data sample is associated with the reflection of an echo signal 106 from the same position on the oscillating component(s) (or the crop material present thereon). Moreover, in further embodiment, the sampling may be performed by the computing system 126. Specifically, in such embodiments, RADAR sensor(s) 102 may be configured to output data at the highest rate supported by the communications protocol of the communicative link 128. In this respect, the computing system 126 may sample the data transmitted from the RADAR sensor(s) 102 at a time interval such that each successive data sample is associated with an echo signal 106 reflected from the same position on the corresponding oscillating component(s) (or the crop material present thereon).

Additionally, at (204), the control logic 200 includes determining the thickness of the crop material present on the oscillating component based on the received data. Specifically, in several embodiments, the computing system 126 may be configured to analyze to the RADAR sensor data received at (202) to determine one or more thicknesses of the crop material present on the oscillating component(s) (e.g., the pan 64, the pre-sieve 66, and/or the sieve 68). For example, in some embodiments, the computing system 126 may determine each thickness value based on the time elapsed between first and second spikes as in the intensity of the corresponding echo signal 106. However, in alternative embodiments, the computing system 126 may determine the thickness of the crop material present on the oscillating component(s) based on the received RADAR sensor data in any other suitable manner.

Moreover, at (206), the control logic 200 include comparing the determined thickness of the crop material to a predetermined thickness range. Specifically, in several embodiments, the computing system 126 may compare the thickness(es) of the crop material present on the oscillating component(s) to an associated predetermined thickness range. When the thickness value(s) determined at (204) falls within the associated range, adjustment of the crop cleaning assembly 62 may not be necessary. In such instances, the control logic 200 returns to (202). Conversely, when the thickness value(s) determined at (204) falls outside of the associated range, adjustment of the crop cleaning assembly 62 may be necessary. In such instances, the control logic 200 proceeds to (208).

At (208), the control logic 200 includes adjusting the operation of the crop cleaning assembly when the determined thickness falls outside of the predetermined thickness range. In several embodiments, when a thickness value(s) determined at (204) falls outside of the associated range, the computing system 126 may be configured to adjust the operation of the corresponding oscillating component(s) within the crop cleaning assembly 62. Specifically, in such instances, the computing system 126 may transmit control signals to the crop cleaning assembly actuator(s) 124 via the communicative link 128. The control signals, in turn, instruct the crop cleaning assembly actuator(s) 124 to adjust the operation of the corresponding oscillating component(s) within the crop cleaning assembly 62. For example, such adjustment(s) may include adjusting the orientation of the oscillating component(s) relative to the frame 26 of the harvester 10 (e.g., the orientation in the longitudinal and/or lateral directions 18, 24). Additionally, or alternatively, such adjustment(s) may include adjusting the oscillatory motion (e.g., the oscillation speed, direction, etc.) of the oscillating component(s). However, in alternative embodiments, at (208), any other suitable operating parameter adjustments may be made. For example, in one embodiment, the speed of the cleaning fan 70 may be adjusted to vary the airflow through the sieve(s) 68.

Figure 9:
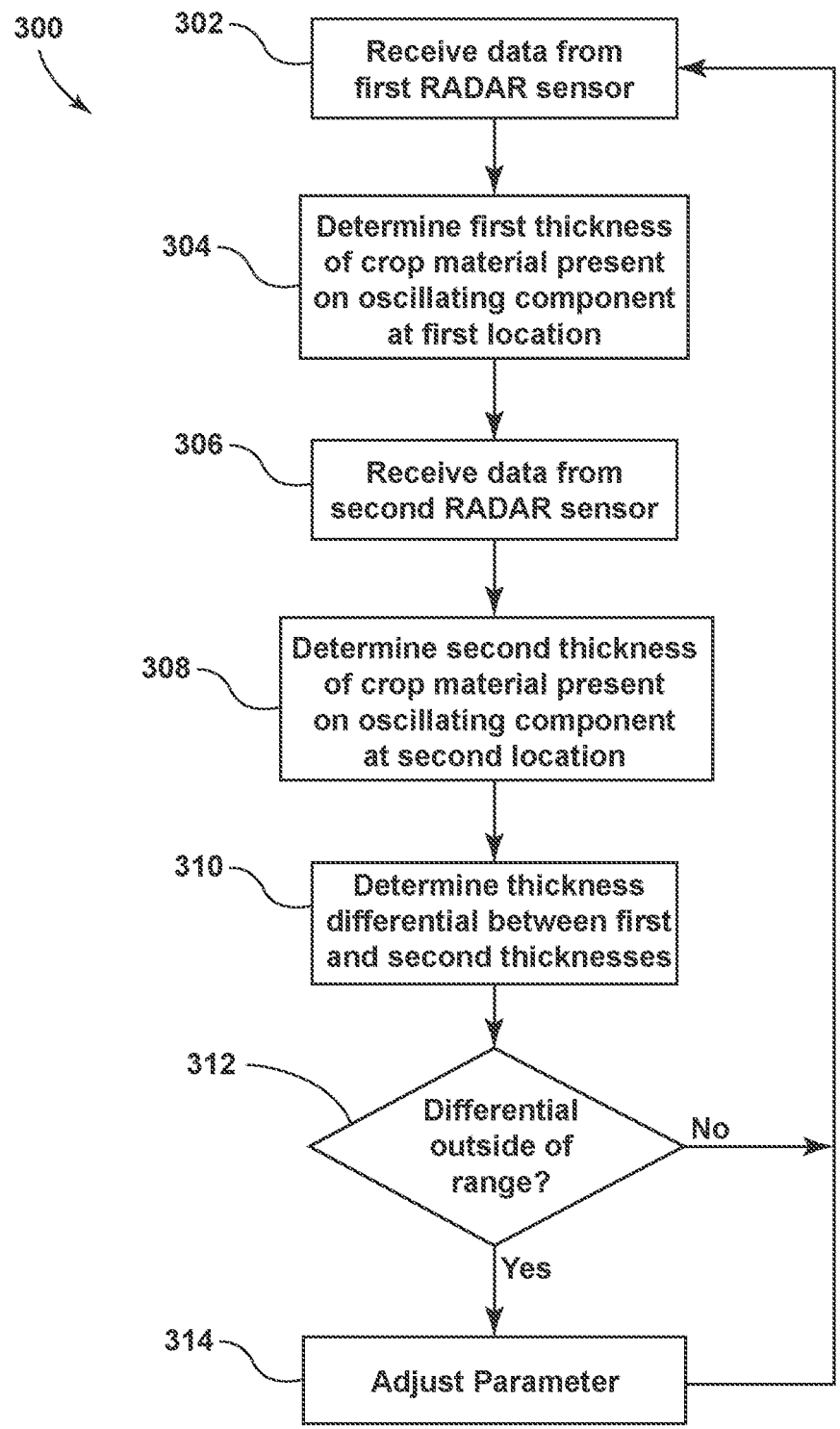
FIG. 9 illustrates a flow diagram providing another embodiment of example control logic for monitoring crop material thickness within an agricultural harvester in accordance with aspects of the present subject matter.

Referring now to FIG. 9, a flow diagram of another embodiment of example control logic 300 that may be executed by the computing system 126 (or any other suitable computing system) for monitoring crop material thickness within an agricultural harvester is illustrated in accordance with aspects of the present subject matter. Specifically, the control logic 300 shown in FIG. 9 is representative of steps of one embodiment of an algorithm that can be executed to monitor crop material thickness within an agricultural harvester in a manner that provides a more accurate determination of crop material thickness than systems relying on acoustic-based sensor data. Thus, in several embodiments, the control logic 300 may be advantageously utilized in association with a system installed on or forming part of an agricultural harvester to allow for real-time monitoring crop material thickness within an agricultural harvester without requiring substantial computing resources and/or processing time. However, in other embodiments, the control logic 300 may be used in association with any other suitable system, application, and/or the like for monitoring crop material thickness within an agricultural harvester.

As shown in FIG. 9, at (302), the control logic 300 includes receiving data from a first RADAR sensor configured to emit a first output signal directed at crop material present at a first location on an oscillating component of a crop cleaning assembly of an agricultural harvester and detect a first echo signal reflected by the crop material present at the first location on the oscillating component. For example, the computing system 126 may be configured to receive data from the first RADAR sensor 102A. The first RADAR sensor 102A may, in turn, be configured to emit a first output signal directed at the crop material present at the first location 108A on the oscillating component (e.g., the pan 64, the pre-sieve 66, and/or the sieve 68). Furthermore, the first RADAR sensor 102A may detect a first echo signal reflected by the crop material present on the oscillating component at the first location 108A.

Additionally, at (304), the control logic 300 includes determining a first thickness of the crop material present on the oscillating component at the first location based on the data received from the first RADAR sensor. For example, the computing system 126 may be configured to determine a first thickness of the crop material present on the oscillating component at the first location 108A based on the data received from the first RADAR sensor 102A.

Moreover, at (306), the control logic 300 includes receiving data from a second RADAR sensor configured to emit a second output signal directed at crop material present at a second location on the oscillating component and detect a second echo signal reflected by the crop material present at the second location on the oscillating component. For example, the computing system 126 may be configured to receive data from the second RADAR sensor 102B. The second RADAR sensor 102B may, in turn, be configured to emit a second output signal directed at the crop material present at the second location 108B on the oscillating component. Furthermore, the second RADAR sensor 102B may detect a second echo signal reflected by the crop material present on the oscillating component at the second location 108B.

In addition, at (308), the control logic 300 includes determining a second thickness of the crop material present on the oscillating component at the second location based on the data received from the second RADAR sensor. For example, the computing system 126 may be configured to determine a second thickness of the crop material present on the oscillating component at the second location 108B based on the data received from the second RADAR sensor 102B.

Furthermore, at (310), the control logic 300 includes determining a thickness differential between the determined first and second thicknesses. For example, the computing system 126 may be configured to determine a differential between the first thickness of the crop material determined at (304) and the second thickness of the crop material determined at (308). The determined differential may, in turn, be indicative of the thickness distribution of the crop material between the first and second locations.

Additionally, at (312), the control logic 300 includes comparing the determined thickness differential to a predetermined thickness differential range. For example, the computing system 126 may compare the thickness differential of the crop material present on the oscillating component to an associated predetermined thickness differential range. When the thickness differential value determined at (310) falls within the associated range, the crop material may be evenly distributed across the oscillating component. In such instances, the control logic 300 returns to (302). Conversely, when the thickness differential value determined at (310) falls outside of the associated range, the crop material may not be evenly distributed across the oscillating component. In such instances, the control logic 300 proceeds to (314).

At (314), the control logic 300 includes adjusting the operation of the crop cleaning assembly when the determined thickness falls outside of the predetermined thickness range. In general, (314) is the same as or substantially similar to (208) in the control logic 200. Such adjustment(s) may, in turn, even out the distribution of the crop material on oscillating component.

Figure 10:
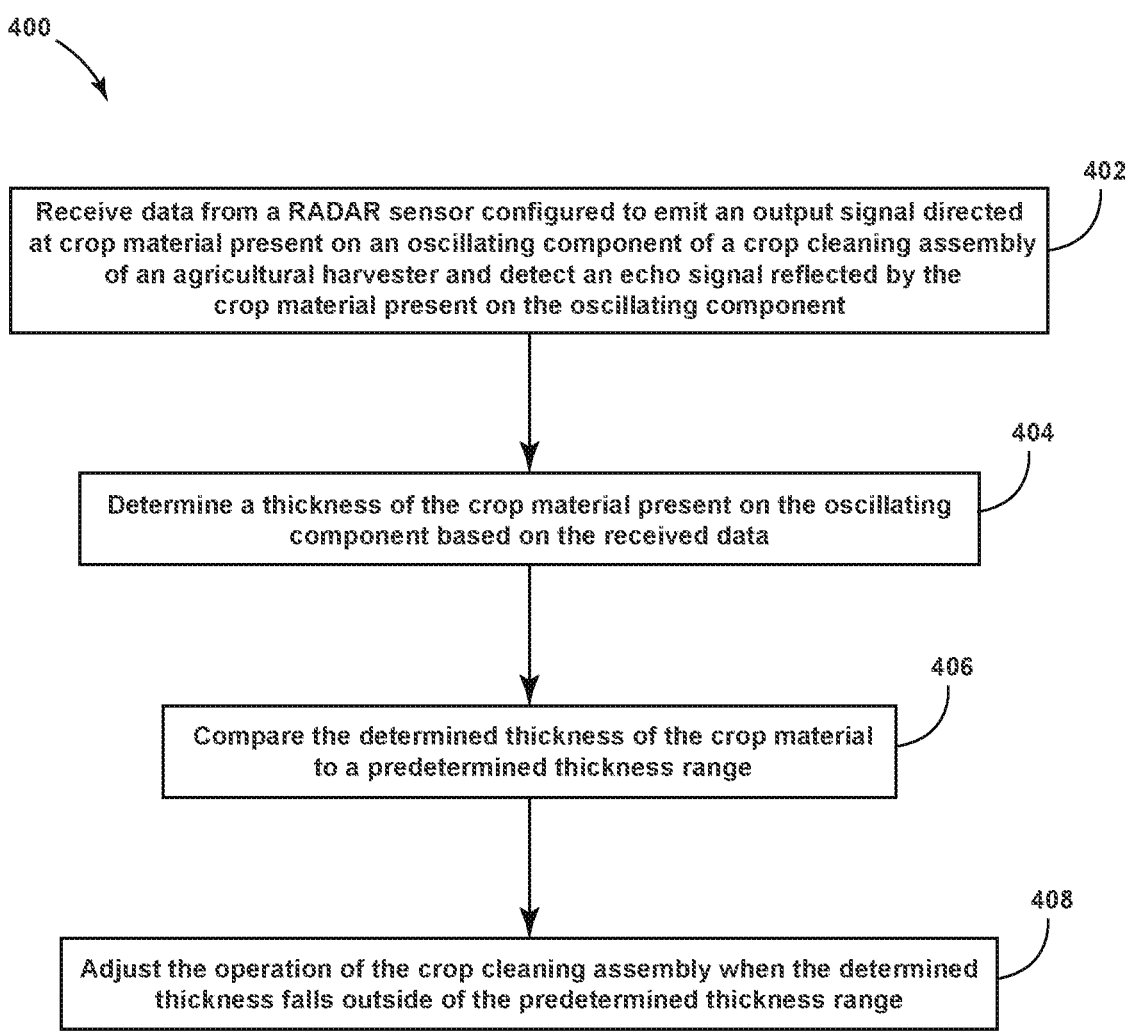
FIG. 10 illustrates a flow diagram of one embodiment of a method for monitoring crop material thickness within an agricultural harvester in accordance with aspects of the present subject matter.

Referring now to FIG. 10, a flow diagram of one embodiment of a method 400 for monitoring crop material thickness within an agricultural harvester is illustrated in accordance with aspects of the present subject matter. In general, the method 400 will be described herein with reference to the agricultural harvester 10 and the system 100 described above with reference to FIGS. 1-9. However, it should be appreciated by those of ordinary skill in the art that the disclosed method 400 may generally be implemented with any agricultural harvester having any suitable harvester configuration and/or within any system having any suitable system configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at (402), the method 400 may include receiving, with a computing system, data from a RADAR sensor configured to emit an output signal directed at the crop material present on an oscillating component of a crop cleaning assembly of an agricultural harvester and detect an echo signal reflected by the crop material present on the oscillating component. For instance, as described above, the computing system 126 may be configured to receive data from one or more RADAR sensors 102. Each RADAR sensor 102 is, in turn, configured to emit an output signal 104 directed at the crop material present on an oscillating component (e.g., the pan 64, the pre-sieve 66, or the sieve 68) of the crop cleaning assembly 62 of the agricultural harvester 10 and detect an echo signal 106 reflected by the crop material present on the oscillating component.

Additionally, at (404), the method 400 may include determining, with the computing system, a thickness of the crop material present on the oscillating component based on the received data. For instance, as described above, the computing system 126 may be configured to determine the thickness(es) of the crop material present on the oscillating component(s) based on the data received from the RADAR sensor(s) 102.

Moreover, as shown in FIG. 10, at (406), the method 400 may include comparing, with the computing system, the determined thickness of the crop material to a predetermined thickness range. For instance, as described above, the computing system 126 may be configured to compare the determined thickness(es) of the crop material to an associated predetermined thickness range.

Furthermore, at (408), the method 400 may include adjusting, with the computing system, the operation of the crop cleaning assembly when the determined thickness falls outside of the predetermined thickness range. For instance, as described above, the computing system 126 may be configured to control the operation of the crop cleaning assembly actuator(s) 124 to adjust the operation of the crop cleaning assembly 62 when the determined thickness falls outside of the predetermined thickness range.

It is to be understood that the steps of the control logic 200, 300 and the method 400 are performed by the computing system 126 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 126 described herein, such as the control logic 200, 300 and the method 400, is implemented in software code or instructions which are tangibly stored on a tangible computer readable medium. The computing system 126 loads the software code or instructions via a direct interface with the computer readable medium or via a wired and/or wireless network. Upon loading and executing such software code or instructions by the computing system 126, the computing system 126 may perform any of the functionality of the computing system 126 described herein, including any steps of the control logic 200, 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural harvester, comprising:
a frame;
a crop cleaning assembly supported on the frame, the crop cleaning assembly including an oscillating component configured to oscillate relative to the frame in a manner that conveys crop material across the oscillating component;
a RADAR sensor configured to emit a radio wave or microwave signal directed at the crop material present on the oscillating component and detect an echo signal reflected by the crop material present on the oscillating component; and
a computing system communicatively coupled to the RADAR sensor, the computing system configured to:
detect a first interface between the crop material and the oscillating component based on the echo signal;
detect a second interface between the crop material and air above the crop material based on the echo signal;
determine a distance between the first interface and the second interface; and
determine a thickness of the crop material present on the oscillating component based on the determined distance.

2. The agricultural harvester of claim 1, wherein the RADAR sensor is positioned below the oscillating component in a vertical direction such that the emitted radio wave or microwave signal is directed upward in the vertical direction toward the oscillating component.

3. The agricultural harvester of claim 1, wherein the computing system is further configured to:
compare the determined thickness of the crop material to a predetermined thickness range; and
adjust an operation of the crop cleaning assembly when the determined thickness falls outside of the predetermined thickness range.

4. The agricultural harvester of claim 3, wherein, when adjusting the operation of the crop cleaning assembly, the computing system is further configured to initiate an adjustment of at least one of an orientation of the oscillating component relative to the frame or an oscillatory motion of the oscillating component.

5. The agricultural harvester of claim 1, wherein the oscillating component comprises a pan or a sieve.

6. A system for monitoring crop material thickness within an agricultural harvester, the system comprising:
a crop cleaning assembly including an oscillating component configured to oscillate relative to a frame of the agricultural harvester in a manner that conveys crop material across the oscillating component;
a RADAR sensor configured to emit a radio wave or microwave signal directed at the crop material present on the oscillating component and detect an echo signal reflected by the crop material present on the oscillating component; and
a computing system communicatively coupled to the RADAR sensor, the computing system configured to:
detect a first interface between the crop material and the oscillating component based on the echo signal;
detect a second interface between the crop material and air above the crop material based on echo signal:
determine a distance between the first interface and the second interface; and
determine a thickness of the crop material present on the oscillating component based on the determined distance.

7. The system of claim 6, wherein the RADAR sensor is positioned below the oscillating component in a vertical direction such that the emitted radio wave or microwave signal is directed upward in the vertical direction toward the oscillating component.

8. The system of claim 6, wherein the computing system is further configured to:
compare the determined thickness of the crop material to a predetermined thickness range; and
adjust an operation of the crop cleaning assembly when the determined thickness falls outside of the predetermined thickness range.

9. The system of claim 8, wherein, when adjusting the operation of the crop cleaning assembly, the computing system is further configured to initiate an adjustment of at least one of an orientation of the oscillating component relative to the frame or an oscillatory motion of the oscillating component.

10. The system of claim 6, wherein the RADAR sensor is coupled to the oscillating component such that the RADAR sensor oscillates with the oscillating component relative to the frame.

11. The system of claim 6, wherein data associated with the echo signal is sampled at a sampling rate set based on an oscillatory motion of the oscillating component.

12. The system of claim 6, wherein the RADAR sensor corresponds to a first RADAR sensor configured to emit a first radio wave or microwave signal directed at the crop material present on the oscillating component at a first location and detect a first echo signal reflected by the crop material present on the oscillating component at the first location such that the distance corresponds to a first distance and the thickness corresponds to a first thickness of the crop material present on the oscillating component at the first location, the system further comprising:
- a second RADAR sensor configured to emit a second radio wave or microwave signal directed at the crop material present on the oscillating component at a second location and detect a second echo signal reflected by the crop material present on the oscillating component at the second location, the second location being different than the first location,
- wherein the computing system is communicatively coupled to the second RADAR sensor, the computing system further configured to;
  - detect a third interface between the crop material and the oscillating component based on the second echo signal;
  - detect a fourth interface between the crop material and air above the crop material based on the second echo signal;
  - determine a second distance between the third interface and the fourth interface; and
  - determine a second thickness of the crop material present at the second location on the oscillating component based on the determined second distance.

13. The system of claim 12, wherein the first location is spaced apart from the second location in a lateral direction of the agricultural harvester extending perpendicular to a direction of travel of the agricultural harvester.

14. The system of claim 12, wherein the first location is spaced apart from the second location in a longitudinal direction of the agricultural harvester extending parallel to a direction of travel of the agricultural harvester.

15. The system of claim 12, wherein the computing system is further configured to determine a thickness differential between the first thickness and the second thickness.

16. The system of claim 11, wherein the computing system is further configured to:
- compare the determined thickness differential to a predetermined differential range; and
- adjust an operation of the crop cleaning assembly when the determined thickness differential falls outside of the predetermined differential range.

17. A method for monitoring crop material thickness within an agricultural harvester, the agricultural harvester including a crop cleaning assembly having an oscillating component configured to oscillate relative to a frame of the agricultural harvester in a manner that conveys crop material across the oscillating component, the method comprising:
- receiving, with a computing system, data from a RADAR sensor configured to emit a radio wave or microwave signal directed at the crop material present on the oscillating component and detect an echo signal reflected by the crop material present on the oscillating component;
- detecting, with the computing system, a first interface between the crop material and the oscillating component based on the echo signal;
- detecting, with the computing system, a second interface between the crop material and air above the crop material based on echo signal;
- determining, with the computing system, a distance between the first interface and the second interface;
- determining, with the computing system, a thickness of the crop material present on the oscillating component based on the determined distance;
- comparing, with the computing system, the determined thickness of the crop material to a predetermined thickness range; and
- adjusting, with the computing system, an operation of the crop cleaning assembly when the determined thickness falls outside of the predetermined thickness range.

18. The method of claim 17, wherein the RADAR sensor corresponds to a first RADAR sensor configured to emit a first radio wave or microwave signal directed at the crop material present on the oscillating component at a first location and detect a first echo signal reflected by the crop material present on the oscillating component at the first location such that the distance corresponds to a first distance and the determined thickness corresponds to a first thickness of the crop material present on the oscillating component at the first location, the method further comprising:
- receiving, with the computing system, data from a second RADAR sensor configured to emit a second radio wave or microwave signal directed at the crop material present on the oscillating component at a second location and detect a second echo signal reflected by the crop material present on the oscillating component at the second location, the second location being different than the first location;
- detecting, with the computing system, a third interface between the crop material and the oscillating component based on the second echo signal;
- detecting, with the computing system, a fourth interface between the crop material and air above the crop material based on the second echo signal;
- determining, with the computing system, a second distance between the third interface and the fourth interface; and
- determining, with the computing system, a second thickness of the crop material present on the oscillating component at the second location based on the second distance.

19. The method of claim 18, further comprising:
- determining, with the computing system, a thickness differential between the first thickness and the second thickness.

20. The method of claim 19, further comprising:
- comparing, with the computing system, the determined thickness differential to a predetermined differential range; and
- adjusting, with the computing system, an operation of the crop cleaning assembly when the determined thickness differential falls outside of the predetermined differential range.

* * * * *